United States Patent
Jahnke et al.

(10) Patent No.: US 8,236,458 B2
(45) Date of Patent: Aug. 7, 2012

(54) HIGH-EFFICIENCY DUAL-STACK MOLTEN CARBONATE FUEL CELL SYSTEM

(75) Inventors: Fred C. Jahnke, Rye, NY (US); Mohammad Farooque, Danbury, CT (US); Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 13/275,524

(22) Filed: Oct. 18, 2011

(65) Prior Publication Data

US 2012/0034538 A1      Feb. 9, 2012

Related U.S. Application Data

(62) Division of application No. 12/194,272, filed on Aug. 19, 2008, now Pat. No. 8,062,799.

(51) Int. Cl.
*H01M 8/06* (2006.01)
(52) U.S. Cl. ........................................ 429/415; 429/425
(58) Field of Classification Search .................. 429/415, 429/416, 425, 423
See application file for complete search history.

(56) References Cited

U.S. PATENT DOCUMENTS

| | | | |
|---|---|---|---|
| 4,031,865 A | 6/1977 | Dufour | |
| 4,182,795 A | 1/1980 | Baker et al. | |
| 4,917,971 A | 4/1990 | Farooque | |
| 5,221,586 A | 6/1993 | Morimoto et al. | |
| 5,413,878 A | 5/1995 | Williams et al. | |
| 5,532,573 A | 7/1996 | Brown et al. | |
| 5,541,014 A | 7/1996 | Micheli et al. | |
| 5,693,201 A | 12/1997 | Hsu et al. | |
| 5,955,039 A | 9/1999 | Dowdy | |
| 5,968,680 A | 10/1999 | Wolfe et al. | |
| 5,993,984 A * | 11/1999 | Matsumura et al. | 429/424 |
| 6,033,794 A | 3/2000 | George et al. | |
| 6,200,696 B1 | 3/2001 | Farooque et al. | |
| 6,213,234 B1 | 4/2001 | Rosen et al. | |

(Continued)

FOREIGN PATENT DOCUMENTS

DE         19637207 A1      3/1998

(Continued)

OTHER PUBLICATIONS

G. Steinfeld et al., "Concept Development of a Ship Service Fuel Cell", 1998 Fuel Cell Seminar Abstracts, Palm Springs, CA, Nov. 16-19, 1998.

(Continued)

*Primary Examiner* — Hae Moon Hyeon
(74) *Attorney, Agent, or Firm* — Cowan, Liebowitz & Latman, P.C.

(57) ABSTRACT

A dual stack fuel cell system comprising a first fuel cell stack comprising a first anode side, adapted to receive fuel and to output a first anode exhaust, and a first cathode side, a second fuel cell stack comprising a second anode side, adapted to receive processed anode exhaust derived from the first anode exhaust and to output a second anode exhaust, and a second cathode side, adapted to receive oxidant gas and to output a first cathode exhaust, wherein the first cathode side receives at least the first cathode exhaust outputted from the second cathode side; and wherein the first fuel cell stack includes indirect internal reforming and the second fuel cell stack may not include any indirect internal reforming.

17 Claims, 2 Drawing Sheets

U.S. PATENT DOCUMENTS

| | | |
|---|---|---|
| 6,344,289 B2 | 2/2002 | Dekker et al. |
| 6,606,850 B2 | 8/2003 | Logvinov et al. |
| 6,609,582 B1 | 8/2003 | Botti et al. |
| 6,623,880 B1 | 9/2003 | Geisbrecht et al. |
| 6,655,325 B1 | 12/2003 | Botti et al. |
| 6,759,154 B2 | 7/2004 | O'Brien et al. |
| 6,868,677 B2 | 3/2005 | Viteri et al. |
| 6,915,869 B2 | 7/2005 | Botti et al. |
| 6,921,595 B2 | 7/2005 | Clawson et al. |
| 6,994,930 B1 | 2/2006 | Geisbrecht et al. |
| 7,060,382 B2 | 6/2006 | Jahnke et al. |
| 7,063,905 B2 | 6/2006 | Menon et al. |
| 7,090,941 B2 | 8/2006 | Baba et al. |
| 7,169,491 B2 | 1/2007 | Schafer |
| 7,247,281 B2 | 7/2007 | Jahnke et al. |
| 7,338,731 B2 | 3/2008 | Ingriselli et al. |
| 7,396,603 B2 | 7/2008 | Farooque et al. |
| 7,939,215 B2 | 5/2011 | Jahnke et al. |
| 8,062,799 B2 * | 11/2011 | Jahnke et al. ............ 429/415 |
| 2004/0058211 A1 | 3/2004 | Tachtler et al. |
| 2004/0071617 A1 | 4/2004 | Blanchet et al. |
| 2005/0048345 A1 | 3/2005 | Meacham |
| 2005/0175869 A1 | 8/2005 | Blanchet et al. |
| 2005/0271914 A1 | 12/2005 | Farooque et al. |
| 2006/0123705 A1 | 6/2006 | Ma et al. |
| 2007/0111055 A1 | 5/2007 | Katikaneni et al. |
| 2007/0141409 A1 | 6/2007 | Cho et al. |
| 2007/0184310 A1 | 8/2007 | Kim et al. |
| 2009/0176134 A1 | 7/2009 | Jahnke et al. |
| 2009/0226775 A1 | 9/2009 | Jahnke et al. |
| 2010/0285378 A1 | 11/2010 | Grieve et al. |

FOREIGN PATENT DOCUMENTS

| | | |
|---|---|---|
| EP | 1686643 A1 | 8/2006 |
| JP | 63-119163 A | 5/1988 |
| JP | 04-065066 A | 3/1992 |
| WO | 02/103833 A1 | 12/2002 |

OTHER PUBLICATIONS

G. Steinfeld et al., "Direct Carbonate Fuel Cell for Ship Service Application", 1999 Joint DOE/EPRI/GRI Fuel Cell Technology Review Conference, Aug. 3-5, 1999, Chicago, IL.

S. Abens et al., "Development of a Ship Service Fuel Cell", Fuel Cell Seminar 2000, Oct. 30-Nov. 2, 2000, pp. 698-701.

S. Abens et al., "Development of a Ship Service Fuel Cell", AES 2000, All Electric Ships, Oct. 26-27, 2000, Paris, France.

S. Abens et al., "Development of a Ship Service Fuel Cell Power Plant", 7th Grove Fuel Cell Symposium, Sep. 2001, London, Great Britain.

S. Abens et al., "Power Plant Development of a Ship Service Fuel Cell", 2002 Fuel Cell Seminar, Nov. 18-21, 2002, Palm Springs, CA.

D. Hoffman et al., "U.S. Navy Shipboard Fuel Cell Program", 2002 Fuel Cell Seminar, Nov. 18-21, 2002, Palm Springs, CA (excerpt from technical paper).

F. Jahnke et al., "Distributed Generation of Hydrogen Using High Temperature Fuel Cells", 15th Annual U.S. Hydrogen Conference, Apr. 17, 2004.

International Search Report dated Apr. 26, 2010 from PCT/US2009/054061.

The above reference was cited in a Supplementary European Search Report issued on Feb. 24, 2012, a copy of which is enclosed, that issued in the corresponding European Patent Application No. 09808675.4.

* cited by examiner

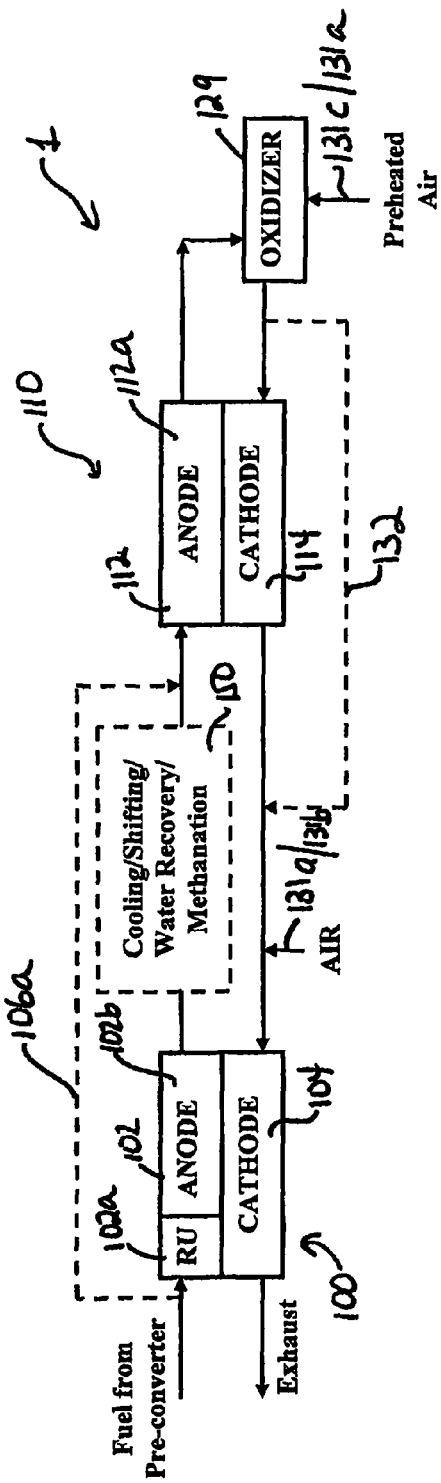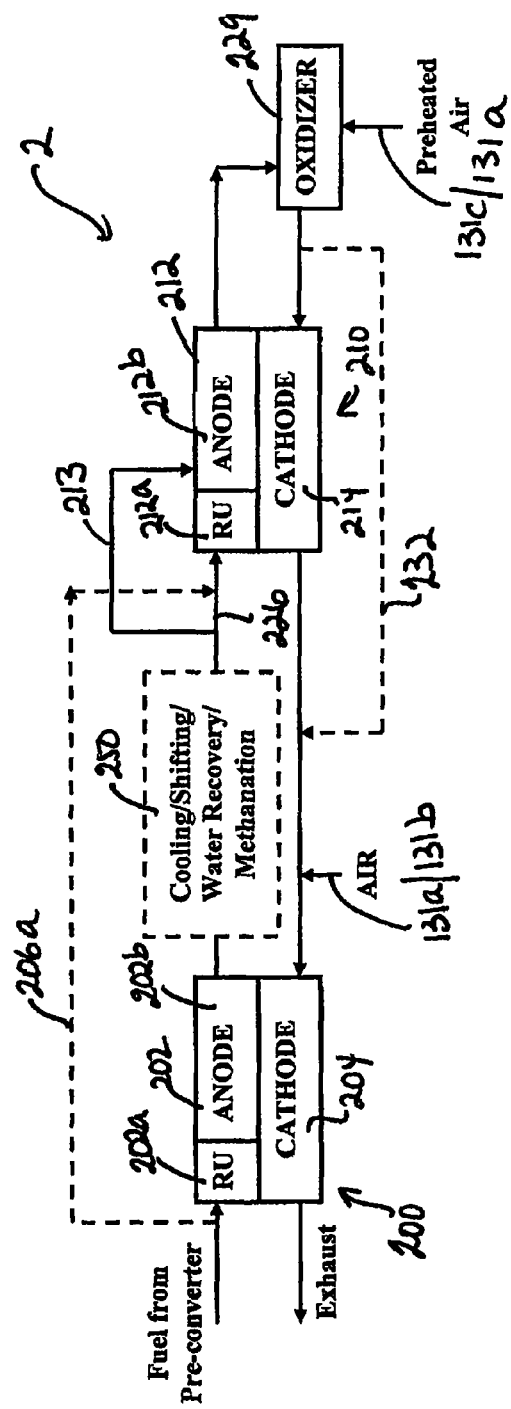

HIGH-EFFICIENCY DUAL-STACK MOLTEN CARBONATE FUEL CELL SYSTEM

CROSS-REFERENCE TO RELATED APPLICATION

This application is a divisional of application Ser. No. 12/194,272 filed on Aug. 19, 2008, now U.S. Pat. No. 8,062,799 the entire disclosure of which is hereby incorporated by reference.

BACKGROUND OF THE INVENTION

This invention relates to fuel cell power production systems and, in particular, to dual-stack molten carbonate fuel cell systems.

A fuel cell is a device which directly converts chemical energy stored in hydrocarbon fuel into electrical energy by means of an electrical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

In internally reforming fuel cells, a steam reforming catalyst is placed within the fuel cell stack to allow direct use of hydrocarbon fuels such as methane, coal gas, etc. without the need for expensive and complex external reforming equipment. In a reforming reaction, fuel cell produced water and heat are used by the reforming reaction, and the fuel is internally reformed to produce hydrogen for use in the fuel cell. Thus, the endothermic reforming reaction can be used advantageously to help cool the fuel cell stack.

Two different types of internally reforming fuel cell assemblies have been developed and commonly used. The first type of internally reforming fuel cell assembly is a direct internally reforming fuel cell assembly, in which direct internal reforming is accomplished by placing the reforming catalyst within the active anode compartment. The advantage of direct internal reforming is that the hydrogen produced through such reforming is provided directly to the anode. A second type of internally reforming fuel cell assembly utilizes indirect internal reforming, which is accomplished by placing the reforming catalyst in an isolated chamber within the stack and routing the reformed gas from this chamber into the anode compartment of the fuel cell. The advantage of indirect internal reforming is that the reforming catalyst is protected from poisoning by the fuel cell's electrolyte.

The present state of the art utilizes a hybrid fuel cell assembly with both direct and indirect internal reforming. For example, U.S. Pat. No. 6,200,696 discloses a hybrid fuel cell system that employs both indirect and direct internal reforming with the delivering of the reformed gas from the indirect reforming chamber to the anode flow field.

As can be appreciated, variable loads, powered by a fuel cell have placed varying power demands on the fuel cell during its operation. Accordingly, fuel cells must efficiently handle these varying power demands, while producing sufficient power to satisfy the demands. As a result, in order to increase the fuel cell efficiency and to improve the handling of high and low power demands, fuel cell systems have been proposed in which the excess hydrogen fuel in the anode exhaust (e.g., in a molten carbonate fuel cell, approximately 10 to 50% of the fuel exits the cell as anode exhaust gas) is either combusted for use in heating or cooling applications, or hydrogen is separated for used by a fuel cell or by other devices, or the exhaust is passed to another device that uses dilute hydrogen, such as another fuel cell or an internal combustion engine. In addition, to improve efficiency, some fuel cell systems extract a portion or all of the hydrogen from the anode exhaust, and recycle the extracted hydrogen fuel back to the anode input of the fuel cell.

U.S. Pat. No. 5,413,878 to Williams, et al. discloses a fuel cell system that includes a plurality of fuel cell stacks connected in series so that the separate electrode flows are networked in a serial co-current, serial countercurrent or a combination of serial and parallel flows. In the Williams, et al. patent, each of the fuel cells stacks is an internally reforming molten carbonate fuel cell stack, and the anodes of the fuel cell stacks are connected in series so that anode exhaust from a first fuel cell stack is passed to an anode of a second fuel cell stack, and so that anode exhaust from the second fuel cell stack is passed to an anode of the third fuel cell stack, and so on.

U.S. Pat. No. 4,917,971, assigned to the same assignee herein, and application Ser. No. 10/860,740, also assigned to the same assignee herein, disclose another power production system, which includes a high temperature fuel cell, such as a molten carbonate fuel cell, and a low temperature fuel cell connected in series, such that anode exhaust from the high temperature fuel cell is conveyed to the low temperature fuel cell for generating additional power and increasing efficiency. In the '971 patent, the anode exhaust from the high temperature fuel cell is cooled and shifted to convert CO and water in the anode exhaust to $CO_2$ and $H_2$, and in the '740 application, water is removed from the anode exhaust so as to increase the concentration of fuel in the exhaust before passing the anode exhaust to the low temperature fuel cell.

The systems disclosed in the Williams, et al. patent, the '971 patent and in the '740 application increase the fuel utilization, and hence, the operating efficiency, of the fuel cell system. However, the additional fuel cell stacks used in these systems for utilizing the unspent fuel in the anode exhaust of the first fuel cell stack result in significant increases in equipment and maintenance costs. The equipment cost of using low temperature fuel cell stacks in the '971 patent and in the '740 application instead of a single stack often outweighs the operating and fuel utilization efficiencies of multi-stack assemblies.

It is therefore an object of the invention to provide an improved dual-stack fuel cell system with improved efficiency.

It is a further object of the present invention to provide a dual-stack fuel cell system with an improved power output at higher efficiency operation.

SUMMARY OF THE INVENTION

The above and other objectives are realized in a dual stack fuel cell system comprising a first fuel cell stack comprising a first anode side adapted to receive fuel and to output a first anode exhaust, and a first cathode side, a second fuel cell stack comprising a second anode side adapted to receive processed anode exhaust derived from the first anode exhaust and to output a second anode exhaust, and a second cathode side, adapted to receive oxidant gas and to output a first cathode exhaust, wherein the first cathode side receives at least the first cathode exhaust outputted from the second cathode side. In certain embodiments, the first fuel cell stack includes indirect internal reforming and the second fuel cell stack does not include any indirect internal reforming. In other embodiments, the first fuel cell stack includes a first indirect internal reformer and the second fuel cell stack includes a second indirect internal reformer, the fuel cell system further including a reformer bypass for bypassing the processed anode exhaust around the second indirect internal reformer to an anode compartment of the second anode side.

In certain embodiments, the dual stack fuel cell system includes at least one of a cooling assembly including at least one cooling member for cooling the first anode exhaust, a reactor assembly including at least one of a shift reactor and a methanation reactor for converting carbon monoxide in the first anode exhaust to respectively at least one of methane and hydrogen, and a water recovery assembly for recovering water from the first anode exhaust, wherein the processed anode exhaust is derived by at least one of cooling the first anode exhaust in the cooling assembly, reacting the first anode exhaust in the reactor assembly and recovering water from the first anode exhaust in the water recovery assembly. In such embodiments, the processed anode exhaust comprises the water separated anode exhaust.

The system further includes thermal management therein by including temperature controls for the first and second fuel cell stacks. In one embodiment, the dual stack fuel cell system includes a first fuel cell stack comprising a first anode side adapted to receive fuel and to output a first anode exhaust and a first cathode side, a second fuel cell stack comprising a second anode side adapted to receive processed anode exhaust derived from the first anode exhaust and to output a second anode exhaust, and a second cathode side adapted to receive a first portion of oxidant gas derived from the second anode exhaust and to output a first cathode exhaust, wherein the first cathode side receives the first cathode exhaust, a second portion of the oxidant gas and additional air from an outside source, and wherein the temperature in the first fuel cell stack is controlled by controlling the amount of additional air received in the first cathode side and the temperature in the second fuel cell stack is controlled by the controlling at least one of the amount of the first portion of oxidant gas received in said second cathode side and the amount of second portion of the oxidant gas received in the first cathode side. The system also includes an oxidizer assembly adapted to receive the second anode exhaust from the second anode side and inlet air and to oxidize the second anode exhaust with the inlet air to produce the oxidant gas.

BRIEF DESCRIPTION OF THE DRAWINGS

The above and other features and aspects of the present invention will become more apparent upon reading the following detailed description in conjunction with the accompanying drawings, in which:

FIG. 2A is a simplified arrangement of the dual-stack molten carbonate fuel cell system of FIG. 1 wherein the first fuel cell stack includes indirect internal reforming and the second fuel cell stack does not include indirect internal reforming; and FIG. 2B is another simplified arrangement of the dual-stack molten carbonate fuel cell system of FIG. 1 in which both the fuel cell stacks include indirect internal reforming;

DETAILED DESCRIPTION

Figure 1:
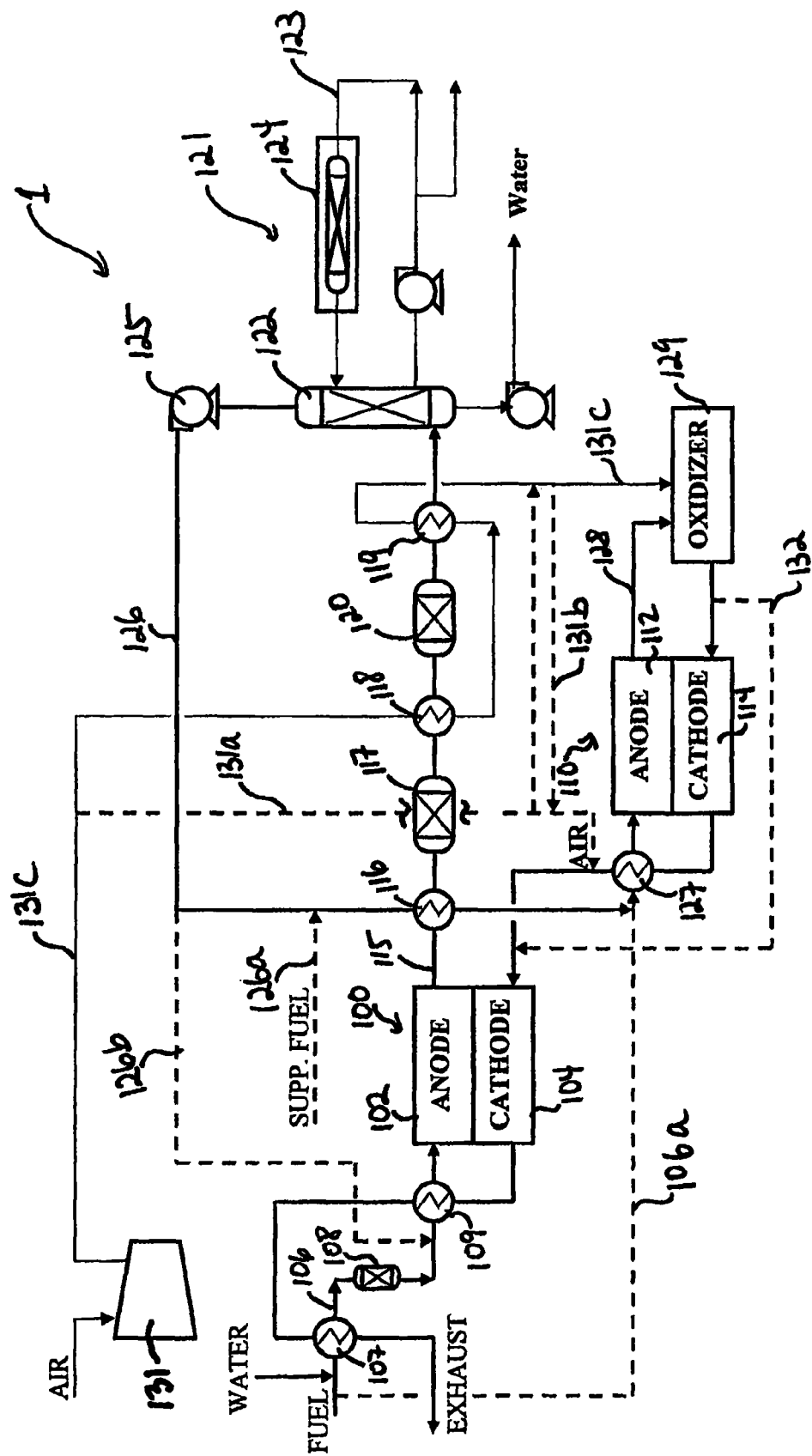
FIG. 1 shows a dual-stack molten carbonate fuel cell system comprising a first molten carbonate fuel cell stack connected in series with a second molten carbonate fuel cell stack.

FIG. 1 shows a dual-stack fuel cell system 1 including two molten carbonate fuel cell stacks connected in series. The system 1 shown in FIG. 1 has improved performance efficiencies, and in particular, higher fuel utilization and power output, compared to conventional single-stack systems, and also provides manufacturing and operational cost efficiencies compared to conventional multi-stack fuel cell systems. The improved performance and cost efficiencies of the system 1 will be described in more detail herein below.

As shown, the system 1 comprises a first molten carbonate fuel cell stack 100 including a first anode side 102 and a first cathode side 104 separated by a molten carbonate electrolyte (not shown), and a second molten carbonate fuel cell stack 110 including a second anode side 112 and a second cathode side 114 separated by a molten carbonate electrolyte matrix (not shown). The first anode side 102 is adapted to receive fuel and to output first anode exhaust, while the second anode side 112 is adapted to receive processed anode exhaust derived from the first anode exhaust and to output second anode exhaust. The second cathode side 114 is adapted to receive oxidant gas derived from the second anode exhaust and to output a first cathode exhaust which is then conveyed to the first cathode side 104. The first fuel cell stack 100 is an internal reforming fuel cell stack, including either direct internal reforming, indirect internal reforming or both, and capable of reforming inlet fuel inputted to the anode side. As discussed in more detail below, the second fuel cell stack 110 is either an internal reforming fuel cell stack including only direct internal reforming or a non-reforming fuel cell. As also discussed below, in some illustrative embodiments, the second fuel cell stack 110 includes indirect internal reforming and a bypass line for bypassing the internal reforming.

As shown in FIG. 1, fuel and is supplied to the system 1 via a fuel inlet line 106 and is conveyed to a humidifier/heat exchanger 107. Water from a water supply and/or recycled water recovered from anode exhaust, as described in more detail herein below, is also provided to the fuel inlet line 106 and is also conveyed to the humidifier/heat exchanger 107. In the heat exchanger 107, the fuel and water from the fuel inlet line 106 are mixed and pre-heated using heat from exhaust gases leaving the first cathode 104 so as to produce pre-heated humidified fuel. Pre-heated humidified fuel is then supplied to a pre-processing assembly 108, such as a pre-converter/deoxidizer, for further processing of the humidified fuel. From the pre-processing assembly 108, the fuel is carried through a heat exchanger 109, where it is further heated using cathode exhaust from the first fuel cell stack 100, before supplying the fuel to the first anode side 102 of the first fuel cell stack 100.

Fuel entering the first anode side 102 of the first fuel cell stack 100 is reformed internally in the stack to produce hydrogen and carbon monoxide and undergoes an electrochemical reaction with oxidant gas passing through the first cathode side 104 of the first stack 100. First anode exhaust, comprising anode exhaust gas produced in the first anode side 102, is outputted from the first fuel cell stack 100 through an anode outlet to an anode exhaust path 115. The first anode exhaust in the exhaust path 115 has a temperature of about 1150 F and comprises unreacted hydrogen, carbon monoxide, water vapor, carbon dioxide and small amounts of other gases. The first anode exhaust is cooled using heat exchangers 116, 118 and 119, and the heat from the anode exhaust is used in the heat exchanger 116 to pre-heat processed anode exhaust before the processed anode exhaust is supplied to the second anode side 112 of the second fuel cell stack 110 and in the heat exchangers 118 and 119 to pre-heat inlet air supplied to the system 1.

As shown in FIG. 1, the first anode exhaust cooled in the heat exchangers 116 and 118 is also reacted in reactor assemblies 117 and 120 before being further cooled in the heat exchanger 119. In one illustrative embodiment of the system shown in FIG. 1, the reactor assemblies 117 and 120 comprise shift reactors, and the first anode exhaust is shifted in the shift reactors 117 and 120 after being cooled in the heat exchangers 116 and 118 and before being further cooled in the heat exchanger 119. The shift reactors 117 and 120 convert carbon monoxide (CO) in the anode exhaust to hydrogen ($H_2$) using a shift catalyst. Because carbon monoxide is the only potential soot forming compound in the first anode exhaust, the shifting of the first anode exhaust eliminates the need for water in the first anode exhaust which is used to suppress soot formation in the second fuel cell stack 110. The shifting of the first anode exhaust also increases the concentration of hydrogen in the first anode exhaust and improves the performance of the second fuel cell stack 110 as a result of higher partial pressures of the reactants, and particularly, the higher partial pressure of hydrogen.

In another illustrative embodiment of the system 1 shown in FIG. 1, the reactors 117 and 120 are methanation reactors 117, 120 which are used to react the first anode exhaust instead of the shift reactors. In the methanation reactors 117 and 120, carbon monoxide and carbon dioxide ($CO_2$) in the first anode exhaust are reacted with unspent hydrogen in the exhaust to produce methane ($CH_4$) and water ($H_2O$). In certain embodiments the methanation reactors 117 and 120 are multi-stage methanation reactors comprising a plurality of methanation stages. An example of a multi-stage methanation reactor is disclosed in U.S. Pat. No. 7,247,281, assigned to the same assignee herein.

As a result of methanation, the first anode exhaust stream is converted from a gas comprising substantially $CO_2$, CO, $H_2$ and $H_2O$ to a gas comprising substantially $CO_2$, $H_2CH_4$ and $H_2O$. Both the shift reaction and the methanation reactions are exothermic and release heat which is removed from the system by further cooling. This heat would otherwise be released in the second stack 110. In addition, when the methane ($CH_4$) in the processed anode exhaust derived from the first anode exhaust is reformed in the second fuel cell 110, heat is removed from the second fuel cell stack 110. Reducing the amount of heat released in the second stack 110 makes the stack capable of operating at a higher current density and thus higher power without overheating. As a result, more power can be produced by the second fuel cell stack 110, greatly reducing the $/kW operating cost of the system 1 and improving the operational efficiency of the system.

As shown in FIG. 1, after being reacted in the reactors 117 and 120, i.e. either shift reactors or methanation reactors, as described above, the anode exhaust is further cooled in the heat exchanger 119 and is thereafter conveyed through a water recovery assembly 121 in which water is recovered from the anode exhaust. The water recovery assembly 121 shown in FIG. 1 includes a packed tower assembly 122 adapted to receive the first anode exhaust cooled by the heat exchanger 119 and to condense at least a portion of the water in the first anode exhaust. As shown, the first anode exhaust is conveyed from the heat exchanger 119 to one end of the packed tower assembly 122, while cooled recycled water is conveyed to an opposing end of the packed tower assembly 122 from a water recycle path 123, so that the anode exhaust and the cooled recycled water flow in opposing directions relative to one another. In the packed tower 122, the first anode exhaust is cooled by direct contact with the recycled water, thus condensing at least a portion of the water in the first anode exhaust. The water condensed from the anode exhaust is mixed with the recycled water as it travels through the packed tower 122. Condensed water comprising a mixture of the recycled water and the water condensed from the anode exhaust is collected at the bottom of the packed tower 122. A first portion of the condensed water collected at the bottom of the packed tower is conveyed to the water recycle path 123, where it is cooled using a heat exchanger 124, such as an airfan, for use as recycled water in the packed tower assembly 122, while a second portion of the condensed water is outputted from the water recovery assembly 121 and may be recycled to the fuel inlet line 106 for humidifying the inlet fuel. U.S. patent application Ser. No. 11/971,663, assigned to the same assignee herein and incorporated herein by reference, discloses a suitable water recovery assembly that may be used in the system 1 of FIG. 1 for recovery of water from the first anode exhaust. As shown in FIG. 1, water separated anode exhaust, after at least a portion of the water has been removed from the first anode exhaust in the water recovery assembly 121, is outputted from the packed tower 122 to a second fuel inlet path 126.

In the above-described embodiments, the processed anode exhaust comprises water separated exhaust which is conveyed by the second fuel inlet path to the second fuel cell anode side 112. As shown, a blower 125 may be used to increase the pressure of the processed anode exhaust in the second fuel inlet path 126 so as to assist conveying the processed anode exhaust through the second fuel inlet path 126. The blower 125 operates at a low temperature and with a low pressure increase, resulting in low compression power and low cost. The blower 125 may be controlled so as to optimize the pressure difference in the first cathode side 104 and the first anode side 102 to minimize leakage between them.

As shown in FIG. 1, in certain embodiments, a portion of the processed anode exhaust gas in the second fuel inlet path 126 is recycled to the fuel inlet line 106 via a recycle line 126b for use in the first anode side 102. The recycled portion of the processed anode exhaust is mixed with the inlet fuel and preheated in the heat exchanger 109 before being conveyed to the first anode side 102. Also, in some illustrative embodiments, supplemental fuel is added to the second fuel inlet path 126 through an inlet path 126a, and in such embodiments, the processed anode exhaust comprises a mixture of the water separated anode exhaust and the supplemental fuel. Before supplying the processed anode exhaust to the second anode side 112 as fuel, the processed anode exhaust is preheated in the heat exchanger 116 using heat from the first anode exhaust, and in a heat exchanger 127 using heat from the first cathode exhaust outputted from the second cathode side 114. As shown in FIG. 1, in some embodiments, a portion of the fuel supplied to the fuel inlet line may also be provided to the second anode side 112 as supplemental fuel. In such embodiments, a portion of the fuel in the fuel inlet line 106 is conveyed via a fuel bypass line 106a to the second fuel inlet path 126 where it is combined with the processed anode exhaust and preheated in the heat exchanger 127 before being supplied to the second anode side 112. Such bypassing of a portion of the fuel through the fuel bypass line provides additional flexibility in operating the system 1.

In some illustrative embodiments, the supplemental fuel comprises methane and is supplied either from an external source via the line 126a or bypassed through the fuel bypass line 106a around the first fuel cell stack. In such embodiments, the operating temperature in the second anode side 112 can be controlled by adjusting the amount of supplemental methane fuel supplied to the second anode side 112. In particular, the amount of the supplemental methane fuel provided to the second anode side 112 is increased so as to decrease the temperature in the second fuel cell side and decreased so as to increase the temperature in the second fuel cell stack.

Processed anode exhaust entering the second anode side 112 of the second fuel cell stack 110 may be reformed internally in the stack using direct internal reforming to produce hydrogen and carbon monoxide, and then undergoes an electrochemical reaction with oxidant gas passing through the second cathode side 114 of the fuel cell stack 110. Second anode exhaust is outputted from the second anode side 112 into a second anode exhaust path 128 and is conveyed by the second anode exhaust path 128 to an oxidizer 129. The oxidizer 129 also receives inlet air compressed by a compressor 131 and preheated by the heat exchangers 118 and 119 through an air inlet path 131c.

In the oxidizer 129, any unburned hydrocarbons in the second anode exhaust are oxidized in the presence of air to produce oxidant gas rich in $CO_2$ and $O_2$. Oxidant gas outputted from the oxidizer 129 is then conveyed to the second cathode side 114 for use as oxidant gas. After being used in the second cathode side 114 of the second fuel cell stack 110, first cathode exhaust comprising partially spent oxidant gas is outputted from the second cathode side 114 and is cooled in the heat exchanger 127 while preheating the processed anode exhaust gas. The first cathode exhaust is then conveyed to the first cathode side 104 of the first fuel cell stack 100. As shown, a portion of the oxidant gas outputted from the oxidizer 129 may be conveyed to the first cathode side 104 via an oxidant bypass line 132 so as to bypass the second cathode side 114 and to supplement the partially spent oxidant gas conveyed to the first cathode side 104. Moreover, supplemental air may be added to, and mixed with, the preheated first cathode exhaust before passing the exhaust and air mixture to the first cathode side 104. As shown in FIG. 1, the supplemental air may be provided via line 131b as a portion of the compressed air compressed by the compressor 131 and preheated in the heat exchangers 118 and 119, or via line 131a as a portion of the compressed air, compressed by the compressor 131, without preheating. In certain embodiments, all or a portion of the compressed supplemental air in the line 131a may be conveyed to the air inlet path 131c so as to control the amount of supplemental air passed to the first cathode side 104 and/or to control the temperature of the air in the air inlet path 131c. As shown, second cathode exhaust comprising spent oxidant gas is outputted from the first cathode side 104 of the first fuel cell stack 100 and is passed through the heat exchangers 109 and 107 so as to preheat inlet fuel before being exhausted from the fuel cell system 1.

As mentioned herein above, the first fuel cell stack 100 is an internal reforming fuel cell stack capable of reforming inlet fuel and including direct internal reforming (DIR) or indirect internal reforming (IIR), or both (IIR-DIR), while the second fuel cell stack 110 is an internal reforming fuel cell stack including only direct internal reforming (DIR) or a non-reforming fuel cell. As can be appreciated, indirect internal reforming (IIR) is accomplished by passing fuel input into the first fuel cell stack 100 through an internal reformer where the fuel is reformed, and thereafter passing the reformed fuel through an anode compartment of the anode side 102. Examples of internal reformers suitable for use in the first fuel cell stack 100 are disclosed in commonly assigned U.S. patent application Ser. Nos. 10/269,481 and 11/030,747, the disclosures of which are incorporated herein by reference. Direct internal reforming (DIR) is accomplished by placing reforming catalyst in the anode compartment(s) of the fuel cell stack, and in particular, by placing the reforming catalyst in corrugations of an anode current collector of the anode compartment(s). An example of a reforming catalyst and its placement within the anode current collector is disclosed in a commonly assigned U.S. patent application Ser. No. 11/280,633, which is incorporated herein by reference.

FIG. 2A shows a simplified arrangement of the dual-stack molten carbonate fuel cell system 1 of FIG. 1 in which the first fuel cell stack 100 is an IIR or an IIR-DIR fuel cell stack, and the second fuel cell stack 110 does not include IIR. In certain illustrative embodiments, the second fuel cell stack 110 is a DIR fuel cell, i.e. including only direct fuel cell reforming, while in other illustrative embodiments the second fuel cell stack 110 is a non-reforming fuel cell.

As shown in FIG. 2A, pre-heated and pre-processed fuel from a pre-processing unit, such as a pre-converter, is supplied to the first anode side 102 of the first fuel cell stack 100. The first anode side 102 includes at least one indirect reformer 102a which receives and reforms the fuel supplied to the anode side 102, and an anode compartment 102b including at least one anode electrode, which receives the fuel reformed by the indirect reformer 102a. In certain illustrative embodiments, the anode compartment 102b includes reforming catalyst placed therein for direct reforming of fuel so that the fuel reformed by the indirect reformer 102a is further reformed within the anode compartment 102b.

As shown, after the reformed fuel undergoes an electrochemical reaction with oxidant gas passing through the first cathode side 104, first anode exhaust is outputted from the anode side 102 of the first fuel cell stack 100. As discussed above, the first anode exhaust is then processed in a processing assembly 150 to produce processed anode exhaust by at least one of cooling the first anode exhaust, reacting the first anode exhaust in a reactor, such as a shift reactor or a methanation reactor, to reduce the amount of carbon monoxide in the first anode exhaust and recovering water from the first anode exhaust in a water recovery assembly. In certain illustrative embodiments, however, the processing assembly 150 of the anode exhaust may be varied so as to omit one or more of the cooling, reacting and water recovery steps depending on the configuration and demands of the fuel cell system.

Processed anode exhaust is then conveyed to the second anode side 112 of the second fuel cell stack 110. In certain embodiments, a portion of the fuel supplied to the system is bypassed around the first fuel cell stack 100 via a fuel bypass line 106a so as to be combined with the processed anode exhaust before being provided to the anode side 112 of the second stack 110. In this way, the bypassed fuel is used as supplemental fuel in the second fuel cell stack 110 and provides greater flexibility in the operation of the system. As discussed herein above with respect to FIG. 1, in some embodiments, supplemental fuel may comprise methane supplemental fuel and can be provided from an external source.

As shown in FIG. 2A, the anode side 112 of the second fuel cell stack 110 includes an anode compartment 112a and does not include an indirect reformer, and thus, the processed anode exhaust is conveyed directly to the anode compartment 112a of the anode side 112 without being first reformed. As mentioned herein above, in certain embodiments, the second fuel cell stack 110 is a DIR fuel cell stack and the anode compartment 112a of the second anode side 112 includes reforming catalyst stored therein for direct reforming of the processed anode exhaust. The use of the DIR fuel cell stack is particularly desired when the processing assembly 150 includes a methanation reactor as discussed herein above, so that the methane produced by the methanation reactions in the methanation reactor can be reformed and used as fuel in the anode compartment 112a.

As shown in FIG. 2A and described herein above, second anode exhaust outputted by the second anode side 112 is conveyed to an oxidizer 129, which also receives preheated inlet air via the air inlet path 131c and/or from the supplemental air line 131a. The oxidizer oxidizes unburned hydrocarbons in the second anode exhaust to produce oxidant gas. As also shown, oxidant gas outputted from the oxidizer 129 is then conveyed to the second cathode side 114 of the second fuel cell stack 110, and first cathode exhaust comprising partially spent oxidant gas is outputted from the cathode side 114 and thereafter conveyed to the first cathode side 104 of the first fuel cell stack 100. In certain embodiments, an oxidant gas bypass line 132 is included for bypassing a portion of the oxidant gas from the oxidizer 129 around the second cathode side 114 so as to convey the oxidant gas to the first cathode side 104 of the first stack 100. In addition, as described herein above, in some embodiments, supplemental air is added to the first cathode exhaust via the line 131a, so as to further cool the first cathode exhaust and the mixture of the first cathode exhaust and air is conveyed to the first cathode side 104. In other embodiments, as described herein above with respect to FIG. 1, the supplemental air may comprise a portion of compressed and preheated air inputted into the system 1 which is conveyed via the line 131b from the air inlet path 131c.

The configuration of the system as shown in FIGS. 1 and 2A provides a number of efficiencies resulting, in part, from using the second fuel cell stack 110 that does not include indirect internal reforming, from using water recovery to recover water from the first anode exhaust and from thermal management in the system, as described herein below. Firstly, the use of the second fuel cell stack 110 that does not include indirect internal reforming results in space and equipment cost efficiencies. In particular, the second fuel cell stack 110 without an indirect internal reformer in this embodiment is capable of holding more individual fuel cell units than an IIR fuel cell stack of the same volume, which also increases the power output of the stack 110. The water recovery from the first anode exhaust not only provides water for humidifying inlet fuel, thus making the system substantially water-independent, but also improves the performance of the second fuel cell stack by increasing the partial pressures of unspent fuel reactants, e.g. $H_2$ and/or $CH_4$, in the processed anode exhaust.

The performance of the first fuel cell stack and the second fuel cell stack, and thus of the system, is further improved through thermal management in the system which is accomplished by controlling the operating temperature in each of the stacks 100, 110. The temperature of the first stack is controlled by controlling the air flow to the system, while the temperature of the second stack is controlled by controlling the amount of oxidant gas supplied to the oxidizer 129 and/or by controlling the amount of oxidant gas bypassed around the second cathode side 114 of the second stack via the bypass line 132.

In particular, when additional cooling is needed in the first fuel cell stack 100, e.g. when the temperature in the first fuel cell stack 100 increases beyond a predetermined temperature such as 1200 F, the air flow to the system 1 is controlled to provide more air to the system, and in particular, to provide an increased air flow to the first cathode side 104 by providing more air to be mixed with the first cathode exhaust outputted from the second cathode side 114. In this way, the additional or supplemental air added to the first cathode exhaust outputted from the second cathode side 114 is used to cool the first cathode exhaust before supplying it to the first cathode side 104 of the first stack 100. The temperature of the second stack 110 is controlled such that when greater cooling is needed in the second stack 110, e.g. the temperature of the second stack 110 is greater than a predetermined temperature such as 1200 F, the air inlet line 131c is controlled to provide additional air via the oxidizer 129 to the second cathode side 114 of the second stack 110.

Moreover, the temperature of the second stack 110 is controlled by controlling the amount of reforming in the second anode side 112 of the second stack 110, particularly in the embodiments of the system of FIGS. 1 and 2A in which the reactor assembly 120 comprises a methanation reactor. In particular, the amount of reforming in the second anode side 112 of the second stack 110 may be controlled, for example, by controlling the flow rate of the processed anode exhaust through the second anode side 112 of the second stack 110, such that more fuel is reformed when the flow rate of the processed anode exhaust is decreased resulting in greater cooling of the stack 110. In addition, the amount of reforming in the second anode side 112 may be controlled by controlling the amount of fuel bypassed around the first anode side 102 through the fuel inlet bypass line 106a. In some embodiments described herein above in which the supplemental fuel comprises methane, the temperature in the second anode side 112 may be controlled by controlling the amount of supplemental fuel provided to the second anode side 112.

Controlling of the temperature and removal of heat from the first and second fuel cell stacks 100, 110 allows the stacks to operate over a broad range of power output. As a result, the temperature profile of each stack 100, 110 is kept relatively uniform, preventing degradation of the stack. In this way, additional operating and maintenance efficiencies are achieved. In addition, the fuel utilization and thus, the power output, of the first and second fuel cell stacks can be adjusted so that the second fuel cell stack consumes unspent fuel in the processed anode exhaust derived from the first anode exhaust at the highest voltage possible, resulting in further efficiency gains. In the system shown and described in FIGS. 1 and 2, the fuel utilization is controlled so that the resulting total fuel utilization is as high as 90%.

FIG. 2B shows another embodiment of the system 2 shown in FIG. 1 in which the second fuel cell stack 210 includes indirect internal reforming. The construction of the embodiment of the system 2 in FIG. 2B is substantially similar to the system 1 shown in FIG. 2A. As shown, the system 2 includes a first fuel cell stack 200 which is an IIR or an IIR-DIR fuel cell stack and a second fuel cell stack 210, which is an DIR or an IIR-DIR fuel cell stack.

A first anode side 202 of the first fuel cell stack 200 receives pre-heated and pre-processed fuel from a pre-processing unit, such as a pre-converter, and reforms the fuel using at least one indirect reformer 202a. The fuel reformed in the reformer 202a is then passed through an anode compartment 202b of the first anode side 202, in which the fuel may be further reformed using a reforming catalyst and undergoes an electrochemical reaction with oxidant gas in a first cathode side 204. First anode exhaust outputted from the first anode side 202 of the first fuel cell stack 200 is then processed in a processing assembly 250 to produce processed anode exhaust by at least one of cooling the first anode exhaust, reacting the first anode exhaust in a reactor, such as a shift reactor or a methanation reactor, to reduce the amount of carbon monoxide in the first anode exhaust, and recovering water from the first anode exhaust in a water recovery assembly, as described above with respect to FIG. 1. As in the first embodiment of FIG. 2A, the processing of the first anode exhaust may be varied so as to omit one or more of the cooling, reacting and water recovery steps depending on the configuration and demands of the fuel cell system.

As shown in FIG. 2B, processed anode exhaust is conveyed from the processing assembly 250 to the second anode side 212 of the second fuel cell stack 210. As shown in FIG. 2B, the anode side 212 of the second fuel cell stack 210 includes an indirect internal reforming assembly 212a and an anode compartment 212b. As mentioned herein above, in certain embodiments, the anode compartment 212b may also include reforming catalyst stored therein for direct reforming of the processed anode exhaust. In addition, the system of FIG. 2B includes a bypass line 213 which is used to bypass processed anode exhaust around the indirect internal reforming assembly 212a of the second anode side 212 so that all or a portion of the processed anode exhaust is supplied directly to the anode compartment 212b. The bypass line 213 can be used to reduce the anode side pressure drop and to control the temperature profile of the second fuel cell stack 210. Because the processed anode exhaust gas has a lower fuel density than input fuel, an excessive pressure drop could occur if all the processed anode exhaust gas is fed to the indirect internal reforming (IIR) assembly 212a of the second stack 210.

In addition, in some embodiments, a portion of the fuel supplied to the system is bypassed around the first fuel cell stack 200 via a fuel bypass line 206a so as to be combined with the processed anode exhaust in line 226 and to be conveyed to the indirect internal reforming assembly 212a of the second stack 210 before being provided to the anode compartment 212b of the second stack 210. The bypassed fuel can be used as supplemental fuel in the second fuel cell stack 210 and provides greater flexibility in the operation of the system and temperature control. For example, the flow of fuel bypassed via the fuel bypass line 206a is controlled to increase when operation at higher temperatures is desired, and to decrease or to cease when operation at lower temperatures is desired.

Generally, fuel bypassed via the fuel bypass line 206a is routed to the indirect internal reforming (IIR) assembly 212a to increase the conversion of methane to hydrogen prior to being passed to the second anode side 212. In addition, although not shown in FIG. 2B, part or all of the supplemental fuel comprising methane may be provided directly to the anode compartment 212b of the second anode side 212. As described herein above with respect to FIG. 1, the amount of supplemental methane fuel provided to the reforming assembly may be used to control the amount of reforming in the indirect internal reforming assembly 212a and the amount of direct internal reforming in the second anode side 212, and thus, the temperature in the second fuel cell stack 210.

As shown in FIG. 2B, second anode exhaust outputted from the second anode side 212 is conveyed to an oxidizer 229, which also receives preheated air via the air inlet path 131c and/or air via the line 131a. The oxidizer 229 oxidizes unburned hydrocarbons in the anode exhaust to produce oxidant gas. Oxidant gas, or a portion thereof, outputted from the oxidizer is then conveyed to the second cathode side 214 of the second fuel cell stack. First cathode exhaust comprising partially spent oxidant gas outputted from the second cathode side 214 is conveyed to the first cathode side 204 of the first fuel cell stack 100. As shown and described herein above with respect to FIGS. 1 and 2A, a portion of the oxidant gas produced by the oxidizer 229 may be bypassed around the cathode side 214 of the second stack using an oxidant gas bypass line 232, so that the bypassed portion of the oxidant gas is conveyed to the first cathode side 204 of the first stack 200. Additional or supplemental air may also be provided to the first cathode side 204 of the first stack 200 through the line 131a and/or the line 131b, mixed with the oxidant gas and/or partially spent oxidant gas. Similarly to the embodiment shown in FIG. 2A, the oxidant bypass line 232 in this embodiment can be used for controlling the temperature in the second fuel cell stack 210, while the additional air supplied to the first cathode side 204 can be used for controlling the temperature in the first fuel cell stack 200.

Like the embodiment of FIG. 2A, the embodiment shown in FIG. 2B provides a number of efficiencies resulting, in part, from using water recovery to recover water from the first anode exhaust, from thermal management in the system, and from using the bypass line 213 for bypassing the first anode exhaust around the internal reforming assembly of the second fuel cell stack. In particular, the use of a bypass line 213 provides additional control of the operating pressure and temperature in the second stack 210, and can also increase the operating life and operating efficiency of the reforming catalyst in the internal reforming assembly. As in the embodiment of FIG. 2A, the water recovery from the first anode exhaust in FIG. 2B provides water for humidifying inlet fuel, thus making the system substantially water-independent, and improves the performance of the second fuel cell stack by increasing the partial pressures of unspent fuel reactants, e.g. $H_2$ and/or $CH_4$, in the processed anode exhaust. In addition, as in FIG. 2A, the performance of the first and second fuel cell stacks 200, 210 and of the system of FIG. 2B is further improved through thermal management in the system which is accomplished by controlling the operating temperature in each of the stacks 200, 210. As described above, the temperatures of the first and second stacks are controlled by controlling the air flow in the system, and the temperature of the second stack is further controlled by controlling the amount of reforming in the internal reforming assembly 212a and in the second anode side 212b. The amount of reforming in the internal reforming assembly 212a can be controlled by adjusting the amount of processed anode exhaust bypassing the reforming assembly via the bypass line 213 and/or by controlling the amount of supplemental methane fuel provided to the internal reforming assembly 212a. The temperature in the second stack can be further controlled by controlling the amount of fuel bypassing the first fuel cell stack 200 via the line 206a.

As discussed herein above, the first and second fuel cell stacks 200, 210 are able to operate over a broad range of power output due to controlling of the temperature and removal of heat from the first and second fuel cell stacks 200, 210. As a result, fuel utilization and power output of the first and second stacks can be adjusted so that unspent fuel from the first stack is consumed in the second stack at highest possible voltage.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

What is claimed is:

1. A dual stack fuel cell system comprising:
a first fuel cell stack comprising a first anode side, adapted to receive fuel and to output a first anode exhaust, and a first cathode side;
a second fuel cell stack comprising a second anode side, adapted to receive processed anode exhaust derived from said first anode exhaust and to output a second anode exhaust, and a second cathode side, adapted to receive oxidant gas and to output a first cathode exhaust;
wherein said first cathode side receives at least said first cathode exhaust outputted from said second cathode side; and wherein said first fuel cell stack includes indirect internal reforming and said second fuel cell stack does not include any indirect internal reforming.

2. A dual stack fuel cell system in accordance with claim 1, wherein said second fuel cell stack is one of a non-reforming fuel cell stack and a direct internal reforming (DIR) fuel cell stack.

3. A dual stack fuel cell system in accordance with claim 2, wherein said first fuel cell stack further includes direct internal reforming (DIR).

4. A dual stack fuel cell system in accordance with claim 2, further comprising at least one of:
- a cooling assembly including at least one cooling member for cooling said first anode exhaust;
- a reactor assembly including at least one of a shift reactor and a methanation reactor for converting carbon monoxide in said first anode exhaust to respectively at least one of methane and hydrogen; and
- a water recovery assembly for recovering water from said first anode exhaust;
wherein said processed anode exhaust is derived by at least one of cooling said first anode exhaust in said cooling assembly, reacting said first anode exhaust in said reactor assembly and recovering water from said first anode exhaust in said water recovery assembly.

5. A dual stack fuel cell system in accordance with claim 4, further comprising an oxidizer assembly adapted to receive said second anode exhaust from said second anode side and inlet air and to oxidize said second anode exhaust with said inlet air to produce said oxidant gas.

6. A dual stack fuel cell system in accordance with claim 5, wherein said cooling assembly comprises a first heat exchanger assembly for cooling said first anode exhaust by transferring heat from said first anode exhaust to said processed anode exhaust and a second heat exchanger assembly for further cooling said first anode exhaust by transferring heat from said first anode exhaust to said inlet air before said inlet air is conveyed to said oxidizer.

7. A dual stack fuel cell system in accordance with claim 4, wherein said water recovery assembly is adapted to receive said first anode exhaust cooled by said cooling assembly and reacted in said reactor assembly, and comprises:
- a packed tower assembly, adapted to receive said first anode exhaust and recycle water, for condensing at least a portion of the water in said first anode exhaust and outputting water separated anode exhaust and condensed water comprising said water recovered from said first anode exhaust and recycle water; and
- a recycle path for cooling and conveying a first portion of the condensed water to said packed tower assembly for use as recycle water, wherein a second portion of said condensed water is outputted from said water recovery assembly and used for humidifying said fuel before conveying said fuel to said first anode side.

8. A dual stack fuel cell system in accordance with claim 7, wherein said processed anode exhaust comprises said water separated anode exhaust.

9. A dual stack fuel cell system in accordance with claim 7, wherein supplemental fuel is added to said water separated anode exhaust and said processed anode exhaust comprises said water separated anode exhaust and said supplemental fuel.

10. A dual stack fuel cell system in accordance with claim 5, wherein a first portion of said oxidant gas produced by said oxidizer is conveyed to said second cathode side and a second portion of said oxidant gas is mixed with said first cathode exhaust from said second cathode side and conveyed to said first cathode side.

11. A dual stack fuel cell system in accordance with claim 10, wherein said first cathode side is further adapted to receive supplemental air from an external source, and
wherein the temperature in said first fuel cell stack is controlled by adjusting the flow of supplemental air to said first cathode side so as to increase the amount of supplemental air flow to said first cathode side to decrease the temperature in said first fuel cell stack and to decrease the amount of supplemental air flow to said first cathode side to increase the temperature in said first fuel cell stack.

12. A dual stack fuel cell system in accordance with claim 5, further comprising an anode exhaust recycle path for passing a portion of said processed anode exhaust to said first fuel cell stack.

13. A dual stack fuel cell system in accordance with claim 1, wherein said first cathode side outputs a second cathode exhaust and wherein heat from said second cathode exhaust is used for preheating said fuel supplied to said first anode side.

14. A dual stack fuel cell system in accordance with claim 4, further comprising a blower for increasing the pressure of said first anode exhaust and for controlling anode-side pressure of said first fuel cell stack.

15. A dual stack fuel cell system in accordance with claim 12, wherein said anode exhaust recycle path passes a portion of the processed anode exhaust outputted from said water recovery assembly to said first anode side.

16. A dual stack fuel cell system in accordance with claim 1, further comprising an inlet fuel bypass path for bypassing a portion of the fuel around said first fuel cell stack to combine the bypassed portion of the fuel with the first anode exhaust.

17. A dual fuel cell stack system in accordance with claim 15, wherein the power output of said second fuel cell stack is varied and the flow of said fuel through said inlet fuel bypass path is correspondingly adjusted with power output.

* * * * *